Jan. 27, 1959 R. W. HUTTON 2,871,298
TOLL RINGING ARRANGEMENTS IN TELEPHONE SYSTEMS
Filed July 23, 1956 4 Sheets-Sheet 1
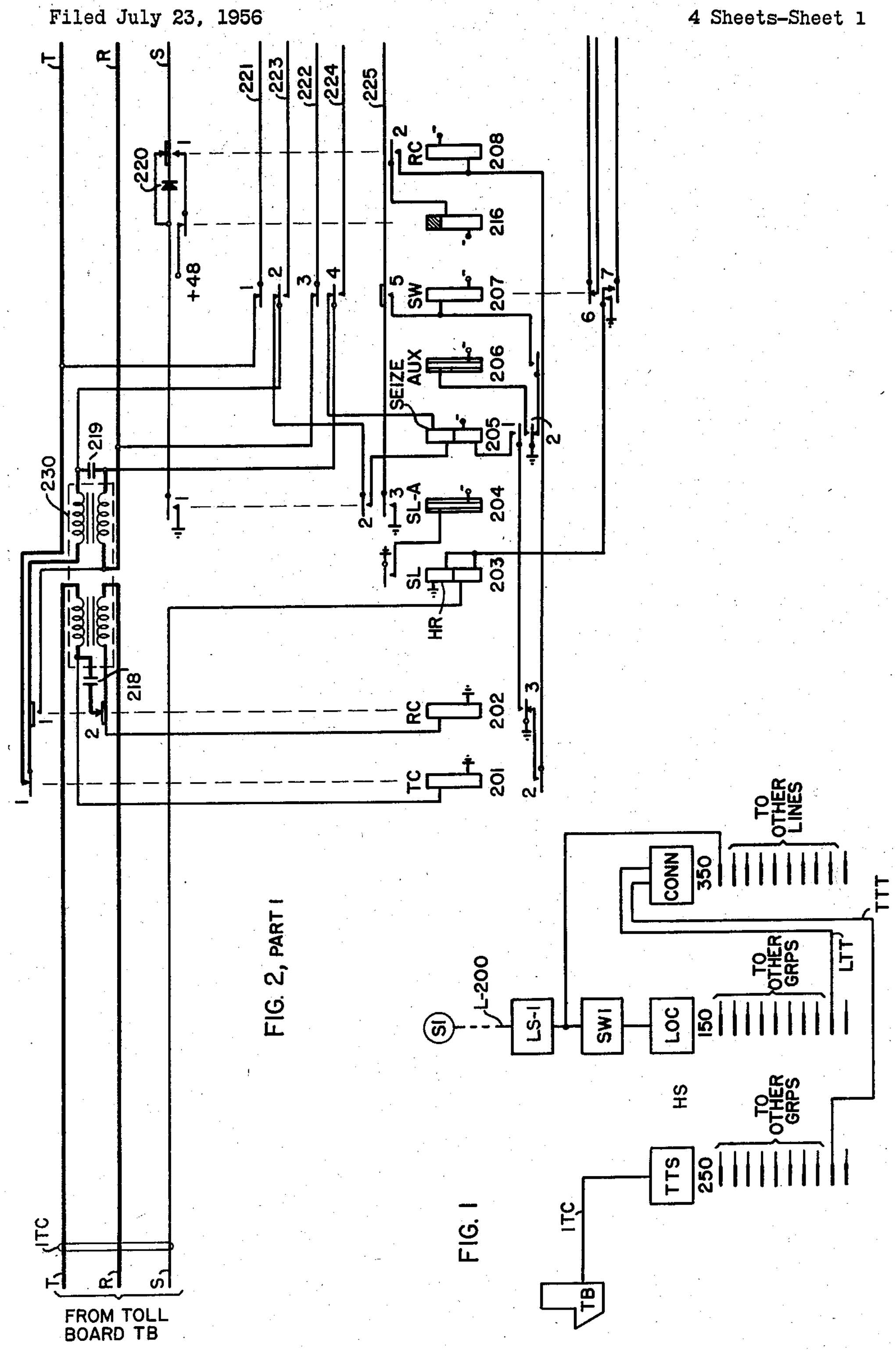
FIG. 2, PART I FIG. 1

Jan. 27, 1959 R. W. HUTTON 2,871,298
TOLL RINGING ARRANGEMENTS IN TELEPHONE SYSTEMS
Filed July 23, 1956 4 Sheets-Sheet 2
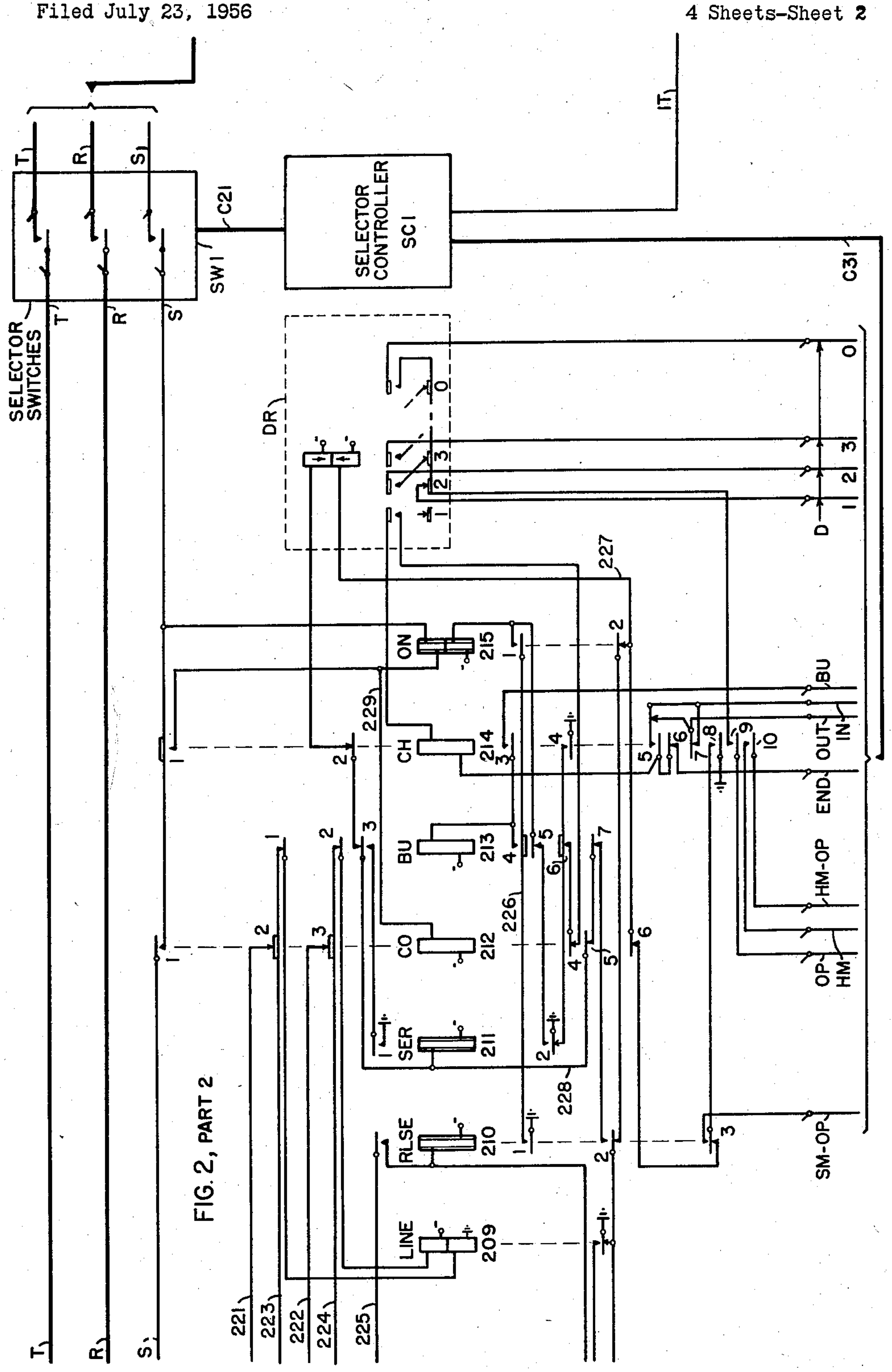
FIG. 2, PART 2

TOLL RINGING ARRANGEMENTS IN TELEPHONE SYSTEMS
Filed July 23, 1956 4 Sheets-Sheet 3
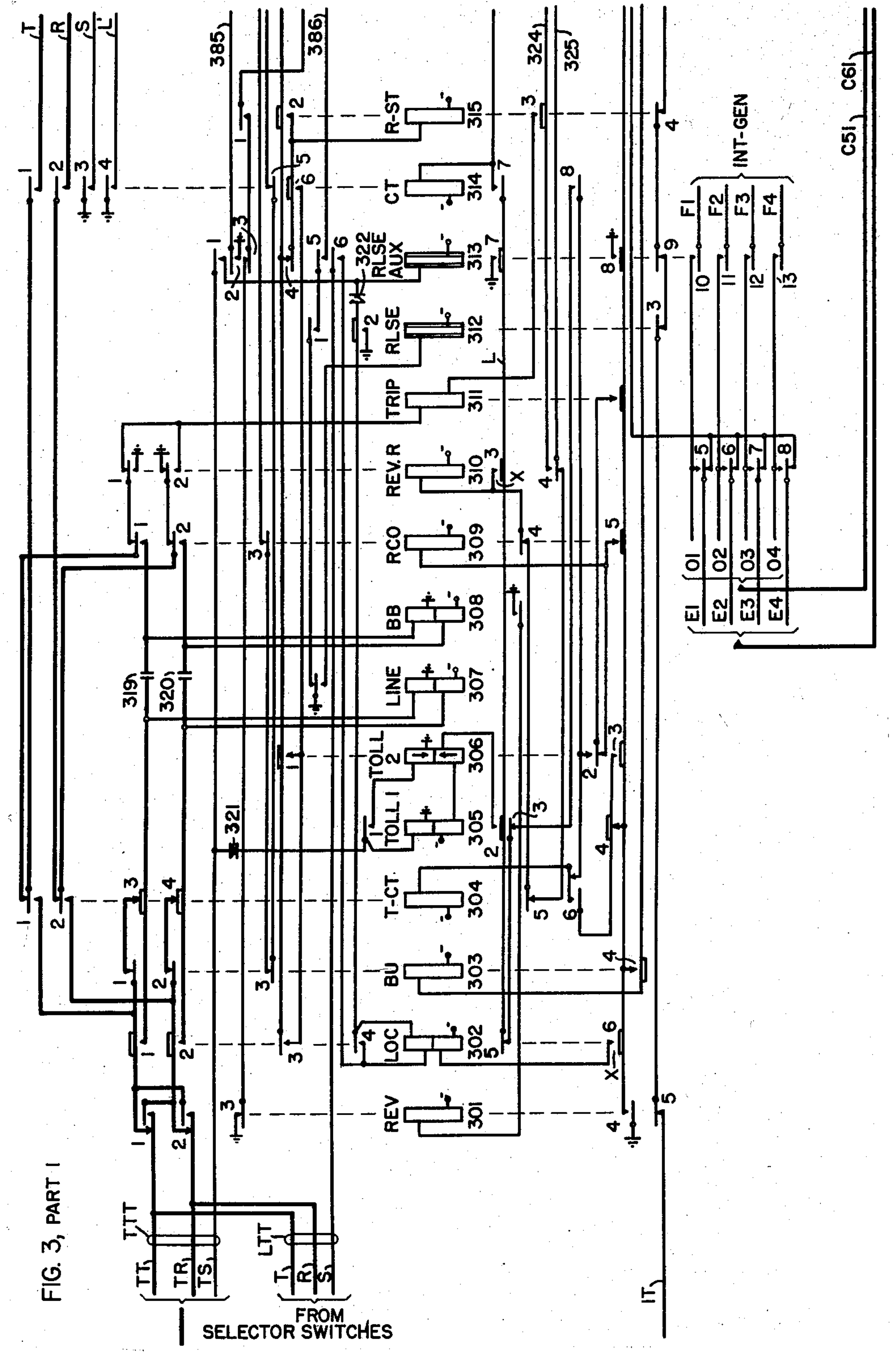
FIG. 3, PART I TOLL RINGING ARRANGEMENTS IN TELEPHONE SYSTEMS
Filed July 23, 1956 4 Sheets-Sheet 4
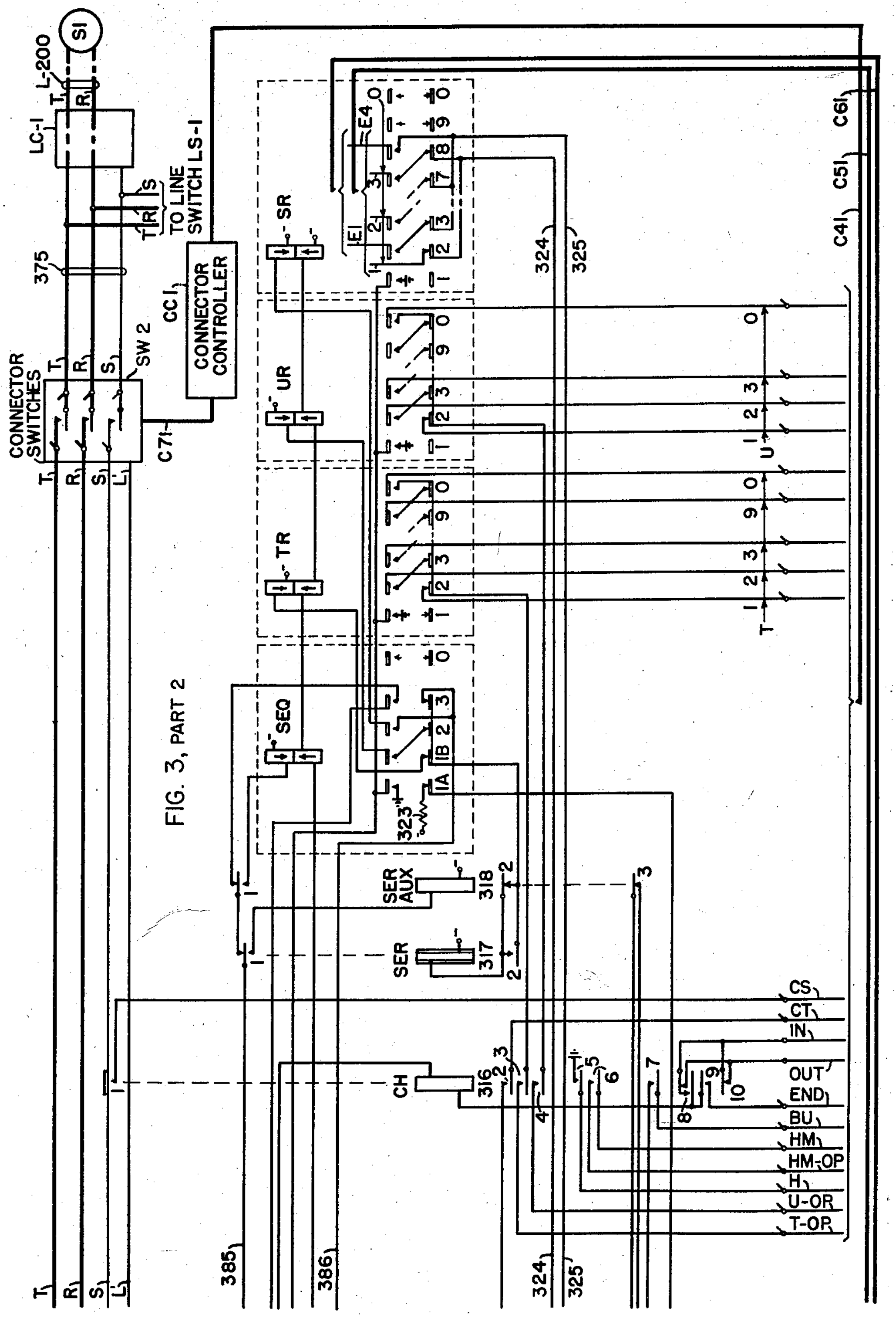
FIG. 3, PART 2

United States Patent Office
2,871,298
Patented Jan. 27, 1959

2,871,298

TOLL RINGING ARRANGEMENTS IN TELEPHONE SYSTEMS

Robert W. Hutton, Chicago, Ill., assignor to International Telephone and Telegraph Corporation, New York, N. Y., a corporation of Maryland Application July 23, 1956, Serial No. 599,402
5 Claims. (Cl. 179—18)

This invention relates in general to toll ringing arrangements in telephone systems and in particular to delayed ring and re-ring control arrangements. Its principal object is to provide a new and improved ringing arrangement whereby the toll operator can simply and economically transmit ringing control over the toll switch train to a toll connector from a toll transmission selector or repeater.

In toll practice on calls which cannot be completed immediately, it is customary for the operator to inform the calling party that he will be notified when the desired party is later reached. Before attempting the call to the desired distant party at a later time, the operator dials and seizes the line of the calling party but delays the ringing thereof until the distant party is reached, whereupon the operator then signals the calling party in order to complete the toll connection. If the calling party is to be recalled after completion of the toll call, re-ringing arrangements are provided whereby the operator may again signal the calling party.

In manual switchboards and small automatic exchanges, the operator, by simple key manipulation, controls the foregoing delayed ring and re-ring operation. However, in larger automatic exchanges wherein the connection to the calling party is over a toll switch train and wherein the ringing voltage is normally supplied from a toll final or connector stage, difficulty is encountered in providing control circuits over the switch train to the connector for the operator to control the application of ringing voltage to a subscriber line.

Heretofore, in known telephone systems having delayed ringing and re-ringing arrangements, the ringing control was transmitted over a fourth conductor in the switch train or was transmitted over one of the talking conductors. The arrangement employing a fourth wire is undesirable in systems employing certain crossbar switches as the cost of the fourth wire renders such arrangements prohibitive, and the arrangement employing one of the talking conductors as a signal path is not feasible in ordinary toll practice as complex supervisory arrangements are required to provide operator supervision due to attachments being connected to the tip and ring conductors at the time ringing is to start. These attachments, may, for example, comprise a differential relay operable when the line becomes unbalanced.

Other known arrangements for delayed ringing operation require the toll operator to seize and hold the called line but withhold the dialing of the stations digit until ringing is desired. This arrangement, like the line-unbalance arrangement, is not feasible due to the line relay being maintained connected to the line conductors until ringing is to start. Further, such arrangement is only applicable to systems employing numbering schemes wherein the stations digit is the last digit dialed.

According to the present invention, the foregoing disadvantages are overcome by transmitting booster battery impulses to the toll connector over the sleeve or control conductor of the toll switch train to control the start of the ringing or to control the re-ringing of the desired lines. This ring start and re-ring control from booster battery impulses transmitted over the sleeve conductor permits the use of standard three-wire crossbar switches in the toll switch train; simplifies the trunk supervision requirements; and permits numerous numbering schemes to be employed.

A feature of the invention relates to re-ringing arrangements whereby any called subscriber on a party-line can be re-signalled after completion of the toll call, such re-ring control, in known systems, being restricted to individual lines.

The above-mentioned and other features and objects of this invention and the manner of attaining them will become more apparent and the invention itself will be best understood, by reference to the following description of an embodiment of the invention taken in conjunction with the accompanying drawings comprising Figs. 1 to 3, wherein:

Fig. 1 shows a single-line trunking diagram of a multi-hundred line system embodying the invention;

Fig. 2, parts 1 and 2, show the toll transmission selector of the system of Fig. 1; and Fig. 3, parts 1 and 2, show the combined toll and local connector of the system of Fig. 1.

GENERAL DESCRIPTION

Referring now to Fig. 1 of the drawings, the general operation of the multi-hundred line exchange shown therein will be described.

The multi-hundred line exchange is shown as being accessible from a toll board TB over an incoming trunk cable ITC, while the local lines, such as line L–200, has access to the switching equipment through its associated line circuit LC–1.

A subscriber at station S1 on a local line L–200, desiring to call another line, removes the receiver and by line-finding action is connected through line circuit LC–1 and line switch LS–1 to a local first selector 150, whereupon dial tone is returned in the well-known manner. Responsive to the dialing of the hundreds digit of the directory number of a desired line thereafter, the selector switch extends the connection to an idle one of the combined toll and local connectors 350 over a local terminating trunk such as trunk LTT. The subscriber thereupon dials the tens, units and stations digits of the directory number of the called subscriber and a connection is then completed to the called line and the desired subscriber thereon is signalled.

The toll operator, at toll board TB, desiring to call a local subscriber at line L–200, makes connection to the incoming toll trunk ITC and is connected to toll transmission selector 250. Responsive to the dialing of the directory number of the desired line, the connection is extended through the selector switches to an idle one of the combined toll and local connectors 350 over an associated toll terminating trunk, such as TTT. Connector 350 is seized and is conditioned to treat the call as a toll call. The operator then dials the tens, units, and stations digits of the desired line and the connection is extended to line L–200 in the well-known manner. At such time, connector 350 being conditioned to treat the call as toll, withholds ringing current from the called line until receipt of spectal control from the operator. This arrangement permits the operator to control the application of ringing current to the called line for delayed-ring operation.

In the event the operator extended a call to a local line L–200 and desires to resignal the subscriber after disconnect thereby, reoperation of the ringing key will cause ringing current to be reapplied to the called line. This re-ring feature will be described in detail hereinafter.

Referring now to Fig. 2, parts 1 and 2, and Fig. 3, parts 1 and 2, of the drawings, a detailed description of the apparatus embodying the invention will be given.

DETAILED DESCRIPTION

The operation of the disclosed system in completing calls will now be described with particular reference to Figs. 2 and 3 which show in more circuit detail the apparatus indicated on Fig. 1. This part of the description covers in detail the operation of the portions of apparatus directly included in the talking path from a toll operator at a toll board through a hundreds selector and through a combined toll and local connector to a called line.

*Toll operation*

When the toll operator at toll board TB desires to call a local line such as line L–200, connection is made to transmission selector 250 over incoming toll trunk ITC in the well-known manner, and battery potential on the sleeve of the toll board circuit operates sleeve relay 203. Contacts on relay 203 operate relay 204.

*Selector seizure*

Responsive to the operation of sleeve auxiliary relay 204, make contacts 2 thereon close an operate circuit for line relay 209 in series with seize relay 205 over the following circuit path: Battery through the upper winding of line relay 209 is extended through break contacts 2 of busy relay 213, break contacts 3 of cutoff relay 212, conductor 222, break contacts 3 of switch relay 207, one of the windings of repeat coil 230, break contacts 4 of switch relay 207, the upper winding of seize relay 205, make contacts 2 of operated sleeve auxiliary relay 204, break contacts 2 of relay 207, one winding of repeat coil 230, break contacts 1 of tip-control relay 201, break contacts 1 of switch relay 207, conductor 221, break contacts 2 of cutoff relay 212, and break contacts 1 of busy relay 213 to ground through the lower winding of line relay 209.

Seize relay 205 and line relay 209 operate. Make contacts 2 of relay 205 operate auxiliary relay 206 and make contacts on line relay 209 operate release relay 210 through contacts of relay 207. Relay 210 locks operated to ground on conductor 225 from make contacts 3 of sleeve auxiliary relay 204.

*Selector digit registration*

Following the seizure of selector 250, the operator dials the hundreds digit of the directory number on the desired line. Each time the calling device (not shown) at toll board TB is operated to transmit a series of impulses, ring control relay 202 operates and holds operated during the dialing of any one digit and tip control relay 201 is operated and restored momentarily for each impulse in the digit series, the toll apparatus at toll board TB being similar to that of Western's No. 3 toll board.

Responsive to the operation and restoration of tip control relay 201 in response to operator dialing, tip-control relay 201 operates and restores for each impulse in a digit series comprising from 1 to 10 impulses. Break contacts 1 on relay 201 open and close the hereinbefore-traced operate circuit of line relay 209, causing it to restore and reoperate according to the impulses in the digit dialed.

Release relay 210 remains operated throughout any series of impulse-induced restorations of line relay 209, it being slow-restoring because of its indicated copper sleeve and relatively light spring load.

Series relay 211 operates promptly upon the first restoration of line relay 209, its operate circuit being from ground at break contacts of line relay 209, through make contacts 2 of release relay 210, break contacts 7 of busy relay 213, and break contacts 5 of cutoff relay 212 to the battery-connected winding of relay 211 over conductor 228. Being slow-restoring because of its indicated copper sleeve, series relay 211 remains operated throughout the digit series of momentary restorations of the line relay. Contacts 2 of relay 211 operate off-normal relay 215 which locks operated to conductor 226. Contacts 2 of relay 215 open the release circuit of register DR.

With release relay 210 maintained continuously operated, each restoration of line relay 210 delivers an impulse at its break contacts to the battery-connected winding of series relay 211, as noted, and further transmits the ground impulses through break contacts 3 of busy relay 213 and break contacts 2 of chain relay 214 to the battery-connected operate winding of digit register DR. When the impulses of the hundreds digits are delivered to the operate winding of digit register DR, its contacts 1 to 10 are actuated successively, responsive respectively to the impulses of the dialed digit.

When line relay 209 comes to rest, operated, at the end of any series of digit impulses, responsive to the tip control relay coming to rest, series relay 211 shortly thereafter restores responsive to the continued open-circuiting of its operate circuit. At its break contacts 2, relay 211 extends ground potential through break contacts 6 of busy relay 213, break contacts 4 of cutoff relay 212, and through make contacts 1 of digit register DR to one side of the winding of chain relay 214.

*Selector controller individualization*

If a battery supply circuit is complete to the chain-end wire extending to selector controller SC1, chain relay 214 operates and its contacts 5, 6 and 7 individualize the selector controller with calling selector 250 to the exclusion of all other selectors, by locking itself operated to the associated chain-end wire and by isolating the chain-out wire from the remaining selectors of the group. This operation is generally as described in the automatic telephone system such as disclosed in the application of R. W. Hutton et al., Serial No. 359,761, filed June 5, 1953, for a Multi-Group Direct-Access Crossbar Switching System.

Responsive to the operation of chain relay 214, make contacts 4 maintain it operated independently of series relay 211; its break contacts 2 open the operate circuit of digit register DR; its make contacts 3 prepare an operate circuit for busy relay 213 in the event that all the trunks extending to the connector group indexed by the dialed digit are busy; its make contacts 8 and 10 energize control wires extending to selector controller SC1 to aid in controlling the selector switches; and its make contacts 9 prepare an operate circuit for grounding the selected one of the digit wires D1 to D0, extending to selector controller SC1.

As described in the noted Hutton et al. application, ground potential appearing on the digit wires D1 to D0 causes operations to occur in the selector controller for selecting an idle trunk extending to the next switching stage and for controlling selector switch SW1 to extend the toll connection therethrough to an idle connector in the called group.

*Trunk test*

In the event that all the trunks in the called level are busy, ground appears on busy wire BU and operates busy relay 213 which locks operated through its make contacts 4. Break contacts 6 of busy relay 213 restore the chain relay to restore selector controller SC1 to common use. Contacts (not shown) provide the operator with a suitable supervisory signal indicating that all the trunks are busy.

In the event there is an idle trunk in the called trunk level corresponding to the hundreds digit dialed, selector controller SC1 controls selector switches SW1 to extend a toll connection from the operator through selector 250 to a trunk, such as TTT, extending to the connector stage.

The test circuit for testing whether the trunks extending to the next switching stage are busy or idle are controlled over the idle test wire IT, which as shown in Fig. 3 of the drawings, has battery potential appearing thereon through resistor 323 whenever the connector is idle. The testing is similar to that described in the noted Hutton et al. application.

*Selector cut-through*

Responsive to the operation of selector switch SW1, the loop closed across line relay 209 and the seize relay 205 is also closed across the tip and ring conductors extending to the connector stage, resulting in the operation of the line relay 307 therein, as will hereinafter be described. Line relay 307 operates and results in the operation of release relay 312 and release auxiliary relay 313 to cause ground to be extended rearwardly on the toll sleeve conductor TS to the battery-connected winding of cutoff relay 212 through contacts 1 of chain relay 214.

Cutoff relay 212 operates, and at its make contacts 1 extend a separate ground potential forward on the sleeve conductor from make contacts 1 of sleeve auxiliary relay 204; its break contacts 2 and 3 restore line relay 209 of selector 250; its break contacts 4 open the operate circuit of chain relay 214, restoring it and freeing the common control apparatus; its break contacts 5 open the operate circuit of series relay 211; and its break contacts 6 open one point in the release circuit of digit register DR.

Chain relay 214, responsive to its restoration, connects the upper winding of off-normal relay 215 in series circuit with cutoff relay 212 to the ground on the sleeve conductor.

With line relay 209 restored, seize relay 205 is held operated in circuit with the line relay 307 of connector 350 in place of line relay 209 of selector 250.

*Connector seizure*

As noted, connector 350 is seized by the closure of the loop across the tip and ring conductors through operation of selector switch SW1 to operate line relay 307. The operate circuit is as follows: From battery through the lower winding of line relay 307, break contacts 4 of relay 304, break contacts 2 of relays 303 and 301 to the tip conductor TR, one winding of repeat coil 230, break contacts 4 of relay 207, the winding of seize relay 205, make contacts 2 of relay 204, break contacts 2 of relay 207, one winding of repeat coil 230, break contacts 1 of relay 201, the tip conductor TT of connector 350, break contacts 1 of relays 301 and 303, and break contacts 3 of relay 304 to ground through the upper winding of relay 307. Contacts on relay 307 operate release relay 312. Contacts 2 of release relay 312 prepare an operate circuit for release auxiliary relay 313.

Release auxiliary relay 313 operates. Its contacts 1 extend its operate ground to the sleeve conductor TS; its break contacts 9 remove the idle-indicating battery potential from the idle test wire IT; its make contacts 7 ground the common locking wire L; and its make contacts 6 closes an operate circuit for the local relay 302.

The connector 350 is now prepared to receive dial impulses of the remaining digits of the directory number of the desired line.

The seizure of the connector is accomplished during the interdigit period and immediately following the dialing of the hundreds digit of the directory number in selector 250, the tens, units, and stations digits are dialed in succession in connector 350.

*Connector digit registration*

Each time the calling device (not shown) at toll board TB is operated to transmit a series of impulses constituting the tens, units, and stations digit, tip control relay 201 is operated and restored momentarily for each such impulse in a series, as herinbefore described for the hundreds digit, and at its break contacts 1, opens and closes the loop across the windings of line relay 307. Line relay 307 restores and reoperates momentarily for each operation and restoration of tip control relay 201.

Release relay 312 and release auxiliary relay 313 remain operated throughout any series of impulse-induced restorations of the line relay 307.

Series relay 317 operates promptly upon the first restoration of line relay 307, its operate circuit being from the back contacts of relay 307, make contacts 1 of release relay 312, make contacts 5 of release auxiliary relay 313, break contacts 3 on the sequence register SEQ, and break contacts 2 of series auxiliary relay 318 to the battery-connected winding of series relay 317. Upon operating, series relay 317 locks operated independent of the series auxiliary relay 318 and at its make contacts 1, completes an operate circuit for the auxiliary relay 318 from the ground on wire 385.

Series auxiliary relay 318 operates; its make contacts 2 open the initial operate circuit of series relay 317; and its contacts 1 prepare an operate circuit for advancing sequence counter SEQ, one step.

With release auxiliary relay 313 maintained continuously operated, each restoration of line relay 307 delivers an impulse at its break contacts to pulse wire 386 which is extended through break contacts 3 and break contacts 1B of sequence device SEQ to the battery-connected operate winding of tens register TR, causing the tens register TR to register the tens digit by actuating its contacts successively, responsive respectively, to the impulses constituting the tens digit.

When line relay 307 comes to a rest, operated, at the end of the tens digit, series relay 317 restores after a slight delay and opens the operate circuit of series auxiliary relay 318 which restores sequentially a short time later. At the time when series relay 317 is restored and series auxiliary relay 318 is yet operated, ground appearing on wire 385 is extended through back contacts 1 of series relay 317 and make contacts 1 of relay 318 to the battery-connected operate winding of sequence register SEQ to deliver a single stepping impulse thereto.

This stepping impulse which is delivered to sequence device SEQ at the end of the receipt and registration of the tens digit, causes both its contact sets 1A and 1B to shift to their alternate position. Make contacts 1A closes an operate circuit for ring-start relay 315 in the event the release auxiliary relay 313 restores; break contacts 1A disconnect idle-indicating battery from the idle test wire IT to prevent the reapplication of idle-indicating potential to the incoming idle test conductor of the connector; break contacts 1B disconnect the incoming pulse wire from the tens register TR; and make contacts 1B transfer such pulse wire to the operate winding of the units register UR.

Responsive to the dialing of the units digit of the called directory number, a series of circuit interruption impulses are transmitted over pulse wire 386 and are extended through break contacts 3 and make contacts 1B of counter SEQ to the battery-connected operate winding of units register UR. The contact sets 1 to 10 of register UR are actuated successively, responsive respectively, to the impulses constituting the units digit. At the same time, these circuit-interruption impulses are transmitted to series relay 317 which operates, as noted, and operates series auxiliary relay 318.

When line relay 307 comes to rest, operated, at the end of the dialing of the units digit, series relay 317 restores after a slight delay and thereafter restores series auxiliary relay 318, as hereinbefore noted. A second stepping impulse is thereupon delivered to the winding of sequence counter SEQ from the grounded conductor 385 causing it to shift its contact sets 2 to their alternate position, which opens the operate circuit of units register UR and transfers the pulsing wire 386 to the winding of stations register SR.

Responsive to the restoration and reoperation of the line relay according to the impulses of the stations digit, ground impulses are transmitted over wire 386 through break contacts 3 and make contacts 2 of sequence counter SEQ to the operate winding of stations register SR. The contact sets 1 to 10 of stations register SR are actuated successively, responsive respectively, to the impulses constituting the stations digit. At the same time, series relay 317 and 318 operate and thereafter restore sequentially to deliver a third stepping impulse to sequence counter SEQ, thereby opening the operate circuit of stations register SR and, at its make contacts 3, preparing an operate circuit for chain relay 316 as hereinafter described.

The stations digit comprises from 1 to 8 impulses, depending on whether the called party is one of four possible stations connected to the tip side of the line or the ring side. The arrangement is such that responsive to the dialing of an even-numbered stations digit, one of the parties on the ring side of the line is signaled and responsive to the dialing of an odd-numbered stations digit, one of the parties on the tip conductor is signaled.

Following the dialing of the stations digit, the ring reverse relay 310 is operated or not depending on the stations digit dialed. Assuming the stations digit dialed to be an even-numbered digit, ground potential from make contacts 8 of release auxiliary relay 313 is extended through break contacts 3 of series auxiliary relay 318 and through break contacts 5 to 8 of relay 310 to conductors E1 to E4 of cable C61 extending to the even-numbered contacts of stations register SR. This ground is then extended through the highest-numbered operated contact set of register SR, over conductor 325, through break contacts 4 of relay 310, break contacts 5 of unoperated toll cut-through relay 304, and break contacts 4 of ring cutoff relay 309 to the battery-connected winding of reverse relay 310.

Reverse relay 310 operates and locks operated to the ground on lock conductor L through its make-first contacts 3 and transfers conductor 325 to the one side of the winding of trip relay 311. Contacts 1 and 2 of relay 310 transfer the ringing current circuit from the tip conductor of the line to the ring conductor; and its make contacts 5 through 8 connect the ringing wires E1 to E4 and O1 to O4 to the four ringing current frequencies in preparation for signalling the selected station on the called line according to the setting of the stations register when the ring start relay 315 operates.

*Controller individualization*

Responsive to the operation of the sequence counter SEQ advancing its contact sets to the third position, and responsive to the restoration of the series relay 317 and series auxiliary relay 318, the ground on wire 385 is extended through break contacts 1 of relays 317 and 318, through make contacts 3 of sequence device SEQ, through break contacts 3 of ring cutoff relay 309 and busy relay 303, and through break contacts 5 of cut-through relay 314 to one side of the winding of chain relay 316.

As noted hereinbefore with reference to selector 250, battery from the chain-end wire completes an operate circuit for the chain relay providing the associated controller is idle and no other connectors have their chain relays operated.

Chain relay 316 operates and at its contacts 8, 9 and 10, becomes individualized with connector controller CC1. Make contacts 1 of relay 316 connect the sleeve of the calling line to the controller for line-testing arrangements; its contacts 2 prepare an operate circuit for cut-through relay 314 in the event the line tests idle; its make contacts 3 and 4 prepare an operate circuit for grounding the selected ones of the tens and units digit wires extending to the controller; its make contacts 5 and 6 extend operating control to controller CC1; and its make contacts 7 connect the busy conductor BU to busy relay 303 in the event the called line is busy.

Responsive to the noted grounding of the selected ones of the tens and units digit wires in response to the ground appearing on the tens operate and units operate wires T–OP and U–OP, the selected one of the tens digit wires and units digit wires extending to the connector controller is grounded thereby resulting in the operation of connector switches SW2 in the manner described in the noted Hutton et al. application.

Responsive to the operation of connector switch SW2, the sleeve conductor S of the called line is extended through make contacts 1 of chain relay 316 to controller CC1 whereupon it is tested to determine the busy or idle condition thereof.

*Called line test*

Assuming the called line to be busy, the sleeve conductor thereof has ground potential thereon and such ground is extended to controller CC1 whereupon the controller returns a busy-indicating ground on busy conductor BU extending through make contacts 7 of chain relay 316 to the battery-connected winding of busy relay 303. In such event, busy relay 303 operates and locks operated through its make contacts 4 to the ground at make contacts 8 of release auxiliary relay 313, and by contacts not shown, returns a busy-tone indication to the calling operator; its break contacts 1 and 2 disconnect the circuit for completing a toll connection to the called line; and its break contacts 3 open the chain operate circuit, permitting the chain relay to restore. The operator thereupon releases the connection and clears out the selector and connector.

Assuming the called line to be idle, the battery potential from the battery-connected winding of the cutoff relay (not shown) of the called line circuit LC–1 causes the connector controller to indicate to the connector that the called line is idle by placing ground on the cut-through conductor CT, such ground being extended to the battery-connected winding of cut-through relay 314 through make contacts 2 of chain relay 316.

*Cut-through operation*

Cut-through relay 314 operates and locks operated. Make contacts 1 and 2 of relay 314 extend the tip and ring conductors of the called line to break contacts 1 and 2 of the toll cut-through relay 304 in preparation for signalling the called line; its make contacts 3 extend ground potential forward on the sleeve conductor S to operate the cutoff relay of the called line circuit to prevent line-finding action by called party answer; its make contacts 4 ground the lock conductor L' to maintain the connector switch SW2 in an operated position; its break contacts 5 open the operate circuit of chain relay 316; its make contacts 6 prepare an operate circuit for ring-start relay 315; and its make contacts 8 close an operate circuit for the toll cut-through relay 304.

Toll cut-through relay 304 operates from ground on lock conductor L extended through break contacts 5 of local relay 302, break contacts 3 of toll control relay 305, make contacts 8 of the cut-through relay 314, and make contacts 6 of toll cut-through relay 304 and locks operated through break contacts 4 of relay 305 to ground at make contacts 8 of release auxiliary relay 313.

Break contacts 1 and 2 of relay 304 connect the tip and ring conductors of the calling line through metallically to repeating coil 230 of selector 250; its break contacts 3 and 4 disconnect line relay 307 from the tip and ring conductors; and its break contacts 5 open the operate circuit of the ring-reverse relay, in the event such relay has failed to operate.

Responsive to the open-circuiting of line relay 307, ground potential is removed from the battery-connected winding of the release relay 312, permitting it to restore. And at the same time, the operate circuit for the seize relay 205 of selector 250 is opened and relay 205 restores.

Responsive to the restoration of seize relay 205 of selector 250, the operate circuit of auxiliary relay 206 is opened. At such time, before auxiliary relay 206 restores, ground potential through back contacts 2 of seize relay 205 is extended through make contacts on relay 206 to the battery-connected winding of switch relay 207.

Switch relay 207 operates and locks operated at its make contacts 5 to the grounded conductor 225, and at its make contacts 2 and 4 connects the ground and battery-connected windings of line relay 209 to the tip and ring conductors of the called line to provide talking battery when the called party answers.

At such time, sleeve relay 203, sleeve auxiliary relay 204, switch relay 207, release relay 210, cutoff relay 212, and off-normal relay 215 are the only relays operated in selector 250, while in connector 350, toll cut-through relay 304, release auxiliary relay 313, cut-through relay 314 are operated, ring reverse relay 310 being operated in the event an even-numbered stations digit was dialed.

*Delayed ring operation*

Assuming the operator to have completed the call to the distant party and desires signalling the originating party, the operator presses the ringing key (not shown) on the toll board TB, resulting in the operation of tip-control relay 201 from battery potential being placed on the tip conductor of the incoming trunk cable ITC.

Tip-control relay 201 operates and at its make contacts 2 extends ground from make contacts 3 of relay 202 to the battery-connected winding of ring control relay 208. Relay 208 operates and extends its operating ground to the battery-connected winding of slow-operating relay 216, which operates a short time later due to the indicated slugged armature end. Responsive to the operation of relay 208, the shunt around rectifier 220 is removed and 48 volt potential positive booster battery is applied to the sleeve, rectifier 220 preventing such battery from being by-passed to ground at make contacts 1 of sleeve relay 204. Booster battery is extended forward on the sleeve conductor S over toll terminating trunk TTT and through rectifier 321 to the ground-connected winding of toll control relays 305 and 306. After restoration of the ringing key, relay 201 restores restoring relays 208 and 216, returning the sleeve conductor to normal.

Toll control relay 305 operates from the booster battery and its make contacts 1 completes an operate circuit for toll control relay 306 which operates. Make contacts 2 of relay 305 complete a locking circuit to locking conductor L, maintaining these relays in an operated condition. Break contacts 3 of relay 305 open the operate circuit of the toll cut-through relay 304, and its break contacts 4 open its locking circuit.

Following the noted operation of toll-control relay 306, ground from off-normal contacts on the counters is extended through make contacts 1 of relay 306 and through make contacts 6 of cut-through relay 314 to ring-start relay 315. Relay 315 operates and locks operated to the operating ground at its make contacts 2.

Toll cut-through relay 304 restores and at its break contacts 1 and 2 completes the ringing circuit for the called line from battery and generator ground through break contacts 1 and 2 of ring cut-off relay 309 and contacts on ring-reverse relay as follows:

Assuming the stations digit 1 to have been dialed, the contact set 1 on stations register SR has been shifted to its alternate position, and ringing current of frequency F1 is extended through make contacts 10 of release auxiliary relay 313, conductor O1 of cable C51 extending to the stations register SR from whence it is extended through break contacts 2 of sequence counter SR, over conductor 324 and through make contacts 3 of ring-start relay 315 to one side of the winding of the trip relay, the other side of such relay being connected through break contacts 1 of the ring-reverse relay 310, ring-cutoff relay 309, and toll cut-through relay 304 to the tip conductor of the called line, signalling the party on the tip side of the line having frequency F1 assigned thereto. For bridged ringing, ground potential from break contacts 2 of ring-reverse relay 310 is extended through break contacts 2 of ring cutoff relay 309 and toll cut-through relay 304 to the ring side of the called line.

Assuming the stations digit dialed to be an even number, such as the digit 2, ring-reverse relay 310 has been operated and stations register SR has both contact sets 1 and 2 shifted to their alternate position, resulting in frequency F1 from the generator being extended through make contacts 10 of release auxiliary relay 313 and through make contacts 5 of reverse-ring relay 310 to conductor E1 of cable C61 extending through make contacts 2 and break contacts 3 of stations register SR, over conductors 325, through make contacts 4 of reverse ring relay 310 to one side of the trip relay. The other side of the trip relay is now connected through make contacts 2 of relays 310, 309 and 304 to the ring side of the called line, and the party on the ring side of the line having frequency F1 assigned thereto is signalled. For bridged ringing, ground from make contacts 1 of relay 310 is placed on the tip conductor.

Responsive to answer by the called party, direct-current flow over the called line loop operates trip relay 311 in the well-known manner. Relay 311, upon operating, extends ground potential from make contacts 8 of release auxiliary relay 313 through make contacts 2 of toll control relay 306 to the battery-connected winding of toll cut-through relay 304.

Toll cut-through relay 304 operates again and locks operated through its make contacts 6 to the operating ground at make contacts 8 of relay 313 through make contacts 3 of toll control relay 306. Contacts 1 and 2 of relay 304 reconnect the tip and ring conductors of the called line directly through to the battery and ground connected windings of line relay 209 of selector 250 and at its break contacts 3 and 4 disconnects line relay 307 therefrom.

Line relay 209 of selector 250 operates and at its break contacts removes ground from one side of the winding of sleeve relay 203 thereby connecting the high resistance winding in series with the sleeve conductor extending to the toll board to provide the operator with answer supervision.

The operator upon receiving answered supervision completes the toll connection, from the called distant party to the call-initiating subscriber.

Following completion of conversation by the calling and called parties over the connection established by the toll operator, disconnect by the call-originating party results in the restoration of line relay 209 which changes the resistance of the toll sleeve to provide disconnect supervision to the operator. Subsequent disconnect by the operator restores all relays to normal and results in the restoration of the registers as will be described in detail hereinafter.

*Re-ringing the called line*

In the event the operator desires to re-ring the originating party without re-establishing the toll switch train connection, reoperation of the ringing key operates tip control relay 201 to cause booster battery potential to be reapplied to the sleeve conductor extending to connector 350, in the manner hereinbefore described. The booster battery is extended through rectifier 321 and energizes the upper windings of the toll control relays 305 and 306. Relay 306 restores as it has its two windings differentially-connected and the resulting flux in the two windings are in opposition.

Responsive to the restoration of toll control relay 306, the locking circuit of toll cut-through relay 304 is opened and the tip and ring conductors of the seized line is connected to the ringing current supply through break contacts 1 and 2. This results in the resignalling of the called line according to the setting of the stations register SR. Answer by the called party results in the operation of trip relay 311.

As hereinbefore described, operation of trip relay 311 results in the reoperation of toll cut-through relay 304 which at its contacts 1 and 2 reoperates line relay 209 to give the operator answer supervision again.

In the above described manner, the operator may resignal the originating party on a party line without resetting the toll switch train, the signalling being of a frequency determined by the setting of stations register SR.

Responsive to disconnect by the called originating party, the line relay 209 restores to give the operator disconnect supervision. Disconnect by the operator thereafter restores the sleeve relay 203, resulting in the clearing out of the selector 250 and connector 350.

Sleeve relay 203 restores relay 204, which restores the selector switch SW1; cutoff relay 212; switch relay 207; and release relay 210. Relay 210 restores off-normal relay 215 which then extends a ground potential from back contacts of line relay 209 to wire 227 extending to the battery-connected restoration winding of register DR. Register DR restores, completing the clearout of selector 250.

Responsive to the restoration of switch SW1, release auxiliary relay 313 restores, restoring relays 305, 306, 310, and 314 by removing ground from lock wire L and at its contacts 8, restores relay 304. Relay 314 releases connector switch SW2. Relay 315 and registers SEQ, TR, UR and SR are yet operated. At such time, ground from break contacts 3 of relay 301 is extended to the battery-connected release winding of the register in series, restoring them. Responsive to the release of all registers, relay 315 restores, completing the clearout of connector 350.

*Local call*

The following portion of the description is concerned with the seizure of connector 350 from a local selector and completion of a call to a local line.

In the event connector 350 is seized from a local hundreds selector 150 in response to a call being initiated by a local line, the selector controller (not shown) tests the idle-test conductor IT in the manner similar to that described for seizure of connector 350 from selector 250.

The seizure of line relay 307, and the consequent operation of release and release auxiliary relays 312 and 313 is similar to that hereinbefore described. However, contacts 6 on relay 313 extend the sleeve conductor S of the local selector 150 to one side of the winding of the local relay 302, the other side being connected to ground at make contacts 2 of release relay 312.

The usual battery potential appearing on the sleeve conductor from the preceding selector stage causes local relay 302 to operate and lock operated through its make-first contacts 6 to ground at make contacts 8 of relay 313. Contacts 1 and 2 of relay 302 connect the tip and ring conductors of the local terminating trunk LTT to line relay 307 independently of busy relay 303 and toll cut-through relay 304; its make contacts 3 prepare an operate circuit for ring-start relay 315; and its break contacts 5 open the operate circuit of toll cut-through relay 304.

The dialing of the tens, units, and stations digit and the setting of the ring-reverse relay 310 is similar to that described with reference to a toll call. However, responsive to the operation of the cut-through relay 314 in response to the called line being idle, an operate circuit is closed for ring-start relay 315 at make contacts 6 of relay 314 through contacts 3 of local relay 302, thereby completing the ringing circuit to the called line, independently of the toll cut-through relay.

In response to called party answer, trip relay 311 operates and at its make contacts extends ground potential through back contacts of unoperated toll-control relay 306 to the battery-connected winding of ring cutoff relay 309. Ring cutoff relay 309 operates and locks operated. At its make contacts 1 and 2, relay 309 transfers the tip and ring conductors of the calling line loop to the battery and ground connected windings of back-bridge relay 308; and its break contacts 3 restore chain relay 316.

Back-bridge relay 308 operates and at its contacts operates reverse relay 301 which reverses the tip and ring conductor to provide any supervisory function desired.

Disconnect by the called and calling subscribers clears out connector 350 in generally the manner described for toll connection clearout.

While I have described above the principles of my invention in connection with specific apparatus, it is to be clearly understood that this description is made only by way of example and not as a limitation to the scope of my invention.

I claim:

1. In an automatic telephone system, connectors serving a group of telephone lines each having one or more stations thereon, three-wire trunks incoming to respective connectors with each trunk including a first and a second talking conductor and a control conductor, each connector including switching means and including switch-control means controllable over its incoming trunk to position the switching means to connect such trunk to any desired one of the lines, means including normally ineffective signalling means in each connector for signalling any desired station on the connected line, start means in each connector for rendering the said signalling means thereof effective, means for transmitting control signals over the control conductor of any incoming trunk, and delayed-ring means in any connector responsive to a said control signal transmitted over the control conductor of its incoming trunk after the switching means is positioned for operating the start means.

2. In an automatic telephone system according to claim 1, means operable responsive to called station answer for terminating the said signalling, and re-ring means in any connector responsive to a said control signal transmitted thereafter over the control conductor of its incoming trunk for resignalling the called station on the connected line.

3. In an automatic telephone system according to claim 2, a ringing control relay for rendering the said ring-start means and the said re-ring means responsive to the said control signals; means responsive to control exercised over the control conductor for operating the said ringing control means to control the said delayed ring relay, and means responsive to further control exercised over the control conductor for restoring the said ringing control relay to control the said re-ring means.

4. In an automatic switching wherein connections from incoming trunks to called lines are extended by way of selectors, local trunks, and connectors at which the local trunks respectively terminate, means for extending any incoming trunk by operating a selector to select a desired group of connectors and to select and seize an idle connector in the selected group over its local trunk, each local trunk including talking conductors and a third conductor, means controlled over the talking conductors of the seized local trunk for operating the seized connector to connect with any desired called line and to prepare for applying ringing current thereto, means rendering the maintenance of the connection to the called line through the selector, seized local trunk, and seized connector dependent upon the maintenance of a holding potential on the said third conductor of the local trunk, means for applying and maintaining said holding potential, signal-transmitting means controlled from the connected incoming trunk for transmitting effective control signals from the operated selector over the third conductor of the seized local trunk to the connector, means included in the signal-transmitting means for rendering the transmitted signals effective while maintaining the effectiveness of the said holding potential, the last-said means including means for altering the holding potential without altering its polarity, and means in the seized connector for applying ringing current to the called line responsive to one of the said control signals.

5. In a switching system according to claim 4, wherein the said means for applying and maintaining the holding potential comprises a holding connection to the said third conductor from one pole of a direct-current source, the said control signals comprising applications of a higher holding potential of the same polarity to the third conductor, and rectifier means included in the said holding connection for preventing the absorption of the said control signals by reverse flow therein.

References Cited in the file of this patent

UNITED STATES PATENTS

| | | |
|---|---|---|
| 2,686,223 | Powell | Aug. 10, 1954 |
| 2,715,159 | Pharis | Aug. 9, 1955 |